United States Patent Office 3,102,050
Patented Aug. 27, 1963

3,102,050
METHOD OF COATING PARTICULATED RESINOUS MATERIAL BY POLYMERIZATION TECHNIQUE
Peter J. Canterino, Bartlesville, Okla., and Lon T. Smith, Lake Jackson, Tex., assignors to Phillips Petroleum Company, a corporation of Delaware
No Drawing. Filed Apr. 21, 1960, Ser. No. 23,629
8 Claims. (Cl. 117—100)

This invention relates to improved molding compositions. In one aspect, the invention relates to a method of modifying a solid monoolefin polymer having a large surface area by polymerizing a liquid monomer thereon. In another aspect, this invention relates to a molding composition comprising a high surface area form of a solid monoolefin polymer having a coating formed by polymerizing a suitable liquid monomer on the surface of the polymer. In another aspect, this invention relates to modifying a solid monoolefin polymer by producing in a form having a large surface area, applying a liquid monomer to the surface of the polymer and subjecting the monomer to polymerization conditions. In another aspect, this invention relates to the method of forming a molded product by inserting into a molding zone a molding composition, which comprises a high surface area form of a solid monoolefin polymer having a coating formed by polymerizing a suitable liquid monomer on the surface thereof, and subjecting to molding conditions. In another aspect, the liquid monomer contains a terminal vinylidene ($H_2C=C<$) group and has a molecular weight in excess of 40. In another aspect, this liquid monomer is a compound of the general formula

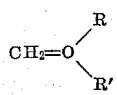

in which R is hydrogen, halogen, or alkyl group such as methyl or ethyl, and R' is a radical such as alkyl, cycloalkyl, aryl, cyano, halogen, carboxyl, pyridyl, quinolyl, keto, ester, or an ether group. In another aspect, the solid monoolefin polymer is a polyethylene having a density of 0.94 to 1.00 gm./cc. at 25° C.

The modification of polymers of some 1-olefins, for example, polypropylene or propylene-ethylene polymers, in the molecular configuration of which there is a multiplicity of tertiary carbon atoms, by peroxidation and subsequent treatment with a monomer to induce graft polymerization is known in the art. However, such a process is not applicable to polyethylene, and particularly the high density polyethylenes produced by low pressure polymerization procedures which are essentially linear, having few, if any, tertiary carbon atoms in their molecular structure to provide sites for grafting.

On the other hand, it is known to coat particulate solids, for example, wood flour, carbon black, titania, and the like by passing vapors of an ethylenically unsaturated monomer into contact with degassed particulate solids coated with a free radical generating addition-polymerization initiator and polymerizing the vaporized, ethylenically unsaturated monomer on the surfaces of the degassed initiator-coated solids. Here, there is no indication that a polymeric product of any kind can be coated with another polymer or that such a coating (or any coating) can be applied by polymerizing a liquid monomer thereon to yield a free flowing, particulate product.

We have now discovered that useful molding compositions can be prepared from solid monoolefin polymers by wetting the polymer, in a high surface area form, with a polymerizable, liquid monomeric material and a polymerization catalyst and subjecting to polymerization conditions.

It is an object of this invention to provide improved molding compositions. It is another object of this invention to provide a novel method for producing improved molding compositions. It is a further object of this invention to provide improved, free flowing molding compositions. It is another object of this invention to provide an improved method of forming a molded product.

Other aspects, objects, and the several advantages of the invention are apparent from a study of the disclosure and the appended claims.

According to this invention, solid monoolefin polymers are modified by coating a high surface area form of the polymer with a polymerizable liquid monomer together with a polymerization catalyst and subjecting to polymerization conditions. The method is particularly well suited for use with a linear polyethylene and more especially with a linear polyethylene containing less than five methyl groups per thousand carbon atoms, and in a preferred embodiment, the method is applied to the modification of a linear polyethylene having a density of 0.94 to 1.00 gm./cc. and having in their molecular structure few, if any, tertiary carbon atoms. The method according to this invention may be practiced using a monomer having a terminal vinylidene group, a molecular weight in excess of 40, which monomers are liquid under the conditions of operation. The monomers can be compounds of the general formula

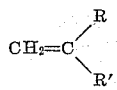

in which R is a hydrogen, halogen, or alkyl group such as methyl or ethyl, and R' is a radical such as alkyl, cycloalkyl, aryl, cyano, halogen, carboxyl, pyridyl, quinolyl, keto, ester, or an ether group. Also, according to this invention, there are provided improved molding compositions comprising an essentially linear polymer having a coating formed by polymerizing a suitable liquid monomer on the surface of said polymer. In one embodiment, according to this invention, an improved molding composition is produced which comprises an essentially linear polyethylene. In another embodiment, there is provided an improved molding composition comprising an essentially linear polyethylene having less than five methyl groups per thousand carbon atoms. In still another embodiment, according to this invention, the improved molding composition comprises an essentially linear polyethylene having a density of 0.94 to 1.00 gm./cc. and having few, if any, tertiary carbon atoms in the molecular structure.

The products obtained by the practice of this invention are finely divided, pulverulent or crumb-like, and free flowing. They can be molded, drawn, or sheeted into films, fibers, or shaped articles. While the products can be obtained by modifying any suitable solid monoolefin polymer, an especially desirable product is obtained when the polymer is a polyethylene. The properties of the products are dependent on the particular monomer used and the amount of polymer formed on the olefin polymer as well as the particular polymer used as a starting material. For example, by polymerizing styrene on particles of difficultly extrudable polyethylene by the method of the present invention, extrudability is considerably improved. Articles molded from polyethylene, on which a dye receptive monomer, such as acrylic acid, vinylpyridine, or the like is polymerized, can be dyed by contacting with dyes reactive therewith.

The process of the present invention is applicable to solid polymers of 1-olefins including high density and low density polyethylenes, polypropylene, ethylene-propylene and ethylene-1-butene copolymers, and the like. Broadly speaking, solid polymers and copolymers of 1-olefins containing from 2 to 8 carbon atoms are useful.

While this process can be applied to the polymerization of polymerizable monomers coated on solid polyolefins in general, it is particularly adapted to linear polyethylenes having a density of 0.94 to 1.00 gm./cc., having in their molecular structure few, if any, tertiary carbon atoms. These polyethylenes are preferably those of linear structure having less than five methyl groups per thousand carbon atoms, such as are described in U.S. Patent 2,825,721, issued March 4, 1958, or from processes using organometal type catalysts.

The polyethylene to be used should be in the form of a powder or of porous particles or crumb in order that a high surface area is presented on which the monomer is adsorbed or coated. Polyethylene ground by a micropulverizer or similar device, particles of polyethylene formed in a chromium oxide catalyzed process at a temperature below the solution temperature of the resin, sometimes referred to as "particle form" polymer, and so-called polyethylene fluff are suitable for use in the process. Polyethylene fluff is polyethylene in the form recovered from a solvent used in the polymerization process. For example, ethylene may be polymerized in cyclohexane at a temperature high enough to dissolve the polymer in the solvent as it forms. This solution is transferred to a monomer removal zone in which unreacted ethylene is stripped for recycling. From this zone, the solution is passed through filters to remove catalyst and then to a dispersion vessel in which it is dispersed in cool (about 100° F.) water. Here the polymer coagulates in particles dispersed in the water along with the solvent. The solvent is removed by steam stripping, after which the water-polymer slurry is separated by skimming and the wet polymer dried. The polymer thus recovered is in the form of porous particles, more or less fibrous in nature.

The linear polyethylenes used can be prepared using catalysts comprising chromium oxide, including a substantial amount of hexavalent chromium, associated with at least one of silica, alumina, zirconia, and thoria, or in the presence of organometal catalysts systems.

The monomers used can be defined as compounds containing a terminal vinylidene ($H_2C=C<$) group, which have a molecular weight in excess of 40, and which are liquid under the conditions of operation. These monomers can be further defined as compounds of the general formula

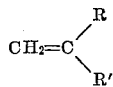

in which R is a hydrogen, halogen, or alkyl group such as methyl or ethyl and R' is a radical such as alkyl, cycloalkyl, aryl, cyano, halogen, carboxyl, pyridyl, quinolyl, keto, ester, or an ether group.

Typical compounds of this formula include styrene, alpha-methyl styrene, alpha-chlorostyrene, acrylic acid, methacrylic acid, acrylonitrile, methyl acrylate, methyl methacrylate, butyl acrylate, butyl methacrylate, vinyl acetate, 1-butene, vinylpyridine, vinylquinoline, cyclohexyl methacrylate, isobutylene, methyl vinyl ether, vinyl naphthalene, vinylidene chloride, and the like. High boiling monomers such as lauryl or cyclohexyl methacrylate are particularly applicable when the polymerization is effected in an extruding device as described below.

Polymerization catalysts suitable for use with these monomers include those of the free radical type such as benzoyl peroxide, dicumyl peroxide, tert-butylbenzene hydroperoxide, potassium persulfate, and the like. In addition, ionic polymerization catalysts of the Friedel-Crafts type such as aluminum chloride, boron fluoride, and the like are applicable when the monomer used is an isoolefin such as isobutylene.

Although in chemical terminology, the term "modify" when applied to a process involving a polymer, may connote an operation in which the molecular structure of the polymer is altered, e.g., by graft polymerization, in this specification and claims, the term is used in a broader sense. It cannot be said that, in the practice of the present invention, no graft polymerization occurs. However, the invention is applicable to polymers in which the graft polymerization, by the nature of the polymers used, is very small and probably is not significant with any solid polyolefin under the conditions of the invention. Therefore, the term "modify," as used herein, includes an alteration in the molecular structure of the polymer as well as changes not involving an alteration of the molecular structure and combinations of the two.

By the practice of the present invention, which comprises applying a polymerizable monomer in liquid phase to the polymer and subjecting to polymerizing conditions, a free flowing product is recovered. Stirring during the polymerization is unnecessary. This result is surprising since it would have been expected that the particles, fibers, or other high surface area form of polymer, would have been cemented together to form agglomerates by polymerizing the liquid monomer at their interfaces. It is emphasized that the present invention does not relay on a peroxidation step to form polymer peroxides and then reacting with an added monomer to produce graft polymers as has been taught in the prior art.

A frequently preferred method of operation comprises dissolving from 0.01 to 3.5 weight percent of the catalyst in the monomer prior to its application to the polyethylene. Alternatively, the catalyst may be applied to the polyethylene prior to wetting with the monomer. The wetting step is preferably at a temperature such that the monomer is in a liquid state.

Application of the monomer to the polyethylene can be made by any suitable means. A convenient method is to tumble the polymer in a drum as the monomer is added, continuing the tumbling until homogeneous distribution is effected. The amount of monomer used will be in the range between about 1.0 and about 100 weight percent based on the polyethylene. The maximum amount will depend on the total surface area of the polyethylene and should not exceed that which can be retained as a coating thereon, i.e., there should be no separate monomer phase other than that coating the polyethylene surface. Operations should be conducted under conditions such that the monomer remains in the liquid phase, using pressure if necessary.

Polymerization conditions will be governed by the monomer-catalyst system used. The temperature range for the polymerization will be in the range between −100° C. and 125° C. When operating with vinyl monomers and a free radical catalyst, polymerization can be effected in the temperature range between 0 and about 125° C. In any case, this temperature should be below the crystalline melting point of the polyethylene. When using an isoolefin with a Friedel-Crafts type catalyst, the temperature will generally be in the range between −100° C. and 0° C. Agitation during the polymerization is unncessary. Polymerization time will be in the range between about five minutes and 100 hours. Preferably, the wetted material will be flushed with an inert gas before heating.

In one embodiment of our process, using a high boiling monomer such as lauryl or cyclohexyl methacrylate and a free radical catalyst, polymerization is effected in the heating zone of an extruding device, polymerization being effected before the temperature rises to the melting point of the composition.

EXAMPLE I

Twelve grams of polyethylene particles were intimately mixed with 6 grams of cyclohexylacrylate in which was dissolved 0.2 gram of benzoyl peroxide. The polyethylene was the same type used in Example III, and the physical properties of this material are given in column 1 of Table I. The wet polymer was placed in a screw-cap container, flushed with nitrogen, the container sealed, and heated at 100° C. for 20 hours. A free flowing product resulted. A portion of this product was molded at 300° F. and 1,000 p.s.i. to yield a substantially clear film.

EXAMPLE II

To 100 grams of polyethylene fluff, the polyethylene having a density of 0.960 gm./cc. and a melt index of 0.9, were added 50 grams of freshly distilled methylmethacrylate to which had been added a catalyst prepared by dissolving 0.5 gram of sodium bisulfite and 0.5 gram of potassium persulfate in about 7.5 ml. distilled water. The polyethylene was stirred continuously during addition of the monomer and for a few minutes thereafter. The resulting mixture, which was dry in appearance and free flowing, was transferred to a container of about one liter capacity which was then flushed with nitrogen, sealed, and heated at 50° C. for 16 hours after which the temperature was elevated to 100° for five hours. The product was then removed and dried at 50° C. for 16 hours in a vacuum oven. The product yield was 130 grams.

A portion of the resin was dissolved in boiling toluene to yield a clear solution. A film was cast from the solution by evaporation of solvent.

A sample of the resin was submitted for evaluation. Prior to testing, the material was mixed on a rubber mill for 10 minutes at 300° F. Values obtained were as follows:

| | |
|---|---|
| Tensile (20″/min.) (p.s.i.) | 2,742 |
| Elongation at break (percent) | 3.0 |
| Zero strength temperature, ° F. | 250 |
| Impact (Izod) (ft. lb.) | 0.69 |

A sample of film returned from the evaluation was glossy and could be flexed repeatedly through 180° without breaking.

EXAMPLE III

A series of runs was made, using high density, linear polyethylene in particles formed in a suspension polymerization system at a temperature below the solution point of the polymer. The particles were coated with a monomer containing a small amount of catalyst, stirred thoroughly to secure a uniform dispersion of the monomer on the particles and transferred to reaction vessels having a capacity of approximately one liter. After flushing with nitrogen, the reactors were sealed and heated at 75° C. for several hours, after which the resin was removed, washed with isopropyl alcohol and dried in a vacuum oven at 50° C. Data on these runs and evaluation of the products are shown in Table I, column 1 giving the physical properties of the unmodified polyethylene polymer and columns 2–5 illustrating the various runs and the properties of the modified material.

Table I
SURFACE POLYMERIZATION OF MONOMERS ON PARTICLE FORM POLYETHYLENE

| Run | 1 | 2 | 3 | 4 | 5 |
|---|---|---|---|---|---|
| Polymer (gm.) | 100 | 100 | 100 | 100 | 100 |
| Methyl methacrylate (gm.) | | 50 | | | |
| Methyl acrylate (gm.) | | | 50 | | |
| Styrene (gm.) | | | | 50 | 100 |
| Benzoyl peroxide (gm.) | | 0.5 | 0.5 | 0.5 | 0.5 |
| Polymerization time (hrs.) | | 72 | 72 | 72 | 72 |
| Wt. ratio PE to monomer | | 2:1 | 2:1 | 2:1 | 1:1 |
| Inherent viscosity | 5.21 | insoluble | insoluble | 4.25 | 3.54 |
| Melt index | 1 0.84 | 1 0.40 | 1 0.41 | 0.02 | 0.05 |
| Density (gm./cc.) | 0.9552 | 0.9990 | 1.018 | 0.9828 | 0.9891 |
| Stiffness (p.s.i.) | 162,000 | 154,000 | 67,000 | 176,000 | 226,000 |
| Tensile (p.s.i.) | 4,314 | 3,862 | 2,524 | 2,132 | 1,717 |
| Elongation (percent) | 65 | 5 | 16 | 2 | 1 |
| Zero strength temperature, °F | 255 | 269 | 150 | 258 | 276 |

[1] Weight on melt indexer 10X standard.

EXAMPLE IV

A series of runs similar to that described in Example III was made using finely ground, linear polyethylene prepared in a solution polymerization (chromia catalyst). Data on these runs are presented in Table II, column 1 giving the physical properties of the unmodified polyethylene and columns 2 and 3 giving the data on the runs and the properties of the modified material.

Table II
SURFACE POLYMERIZATION OF MONOMERS ON POWDERED POLYETHYLENE

| Run | 1 | 2 | 3 |
|---|---|---|---|
| Polymer (gm.) | 100 | 140 | 40 |
| Acrylonitrile (gm.) | | 10 | |
| Acrylic acid (gm.) | | | 10 |
| Styrene (gm.) | | | 10 |
| Benzoyl peroxide (gm.) | | 0.1 | 0.1 |
| Polymerization time (hr.) | | 72 | 18 |
| Weight ratio PE to monomer | | 14:1 | 4:1 |
| Inherent viscosity | 2.00 | 3.24 | insoluble |
| Melt index | 0.68 | 0.33 | 0.14 |
| Density (gm./cc.) | 0.9618 | 0.9644 | 0.9935 |
| Stiffness (p.s.i.) | 185,000 | 149,000 | 186,000 |
| Tensile (p.s.i.) | 4,772 | 4,700 | 3,364 |
| Elongation (percent) | 20 | 19 | 2 |
| Zero strength temperature, °F | 234 | 242 | 252 |
| Nitrogen analysis (Dumas) | | 0.5 | |

EXAMPLE V

A run was made similar to those of Examples III and IV, but using polyethylene fluff, the same material described in Example II. In this run, 66 grams of polyethylene were wet with 33 grams of styrene containing 0.1 gram of benzoyl peroxide. The wet polymer was heated in a reactor of about one liter capacity at 75° C. for 72 hours. The product was removed, washed with isopropyl alcohol, dried in a vacuum oven, and evaluated. Properties of the polymer are shown below.

| | |
|---|---|
| Inherent viscosity | 1.68 |
| Melt index | 0.54 |
| Density (gm./cc.) | 0.9822 |
| Stiffness (p.s.i.) | 209,000 |
| Tensile (p.s.i.) | 2,822 |
| Elongation (percent) | 2 |
| Zero strength temperature, ° F. | 264 |

EXAMPLE VI

Portions of the product from Example IV, runs 2 and 3 were molded into slabs on a hydraulic press at 320° F. and cooled to room temperature (cooling period about 10 minutes). Strips were cut from the slabs and immersed in a hot (200° F.) 2 percent aqueous solution of Brilliant Green Crystals, a basic dye supplied by E. I.

du Pont de Nemours and Company, at 200° F. for about 30 minutes. The slab was then removed, washed with water, and dried. A uniform deep green color was obtained.

Throughout the runs made to evaluate the invention, it was surprising to note that a polymer in particulate form could be wetted with a monomer containing a polymerization catalyst and, after subjecting the mixture to polymerization conditions, to recover a free flowing particulate product. It would have been expected in such a procedure that the polyethylene particles would have been bound together in fairly large agglomerates by polymer forming at the interface. The free flowing material recovered has particular utility for use as molding powders since the polyethylene coated with polystyrene, for example, has improved processability. Mechanical blends of polyethylene with polystyrene, on the other hand, do not provide homogeneous structures when molded. Molding powders comprising polyethylene coated with polyacrylic acid have improved dyeability in the presence of basic dyes, as compared with unmodified polyethylene or with a mixture of polyethylene and polyacrylic acid formed by mechanical blending.

Throughout the application, high surface area form is used to denote generically physical forms of the polymer in which the ratio of surface area to volume is high. For example, included are particulate materials, granular, powder, and fibrous materials such as the fluff described elsewhere in the application. For the pulverulent material, the polymer particles will preferably be 40 mesh or smaller (U.S. standard sieve). Polyethylene fluff is a porous material, the bulk density of which can vary considerably, depending upon conditions of manufacture. The particle size of this material does not determine the ratio of surface area to volume. Polyethylene fluff which will absorb 50 percent or more of its own weight of monomers is considered to be a high surface area form.

Reasonable variation and modification are possible within the scope of the foregoing disclosure and the appended claims to the invention, the essence of which is that solid monoolefin polymers, in a high surface area form such as powder or fluff, are coated with a liquid monomer and a catalyst for the monomer, and subjected to polymerization conditions for the monomer, thus producing polymers having a coating formed by polymerizing a suitable monomer on the surface of the polymer, as described herein.

We claim:

1. The method for producing a free-flowing composition which comprises:

producing a fine granular polyethylene having a density of 0.94 to 1.00 gm. per cc. and a particle size of up to 40 mesh;

applying to said granular polyethylene directly without intermediate chemical treatment, a liquid monomer and a polymerization catalyst therefor, the amount of said monomer used being in the range between about 1 and about 100 weight percent based on said polyethylene;

subjecting the resulting monomer wet high surface area form of polyethylene to polymerization conditions for such monomer, in the absence of a diluent, without stirring; and recovering said free-flowing composition directly as the result of said method.

2. The method for producing a free-flowing composition which comprises:

producing polyethylene fluff, said polyethylene having a density of 0.94 to 1.00 gm. per cc. and said fluff being capable of absorbing at least about 50 percent of its own weight of liquid monomers;

applying to said fluff directly without intermediate chemical treatment, a liquid monomer and a polymerization catalyst therefor, the amount of said monomer used being in the range between about 1 and about 100 weight percent based on said polyethylene;

subjecting the resulting monomer wet polyethylene fluff to polymerization conditions for said monomer, in the absence of a diluent, without stirring; and recovering said free-flowing composition directly as the product of said method.

3. The method of producing a free-flowing composition which comprises:

recovering particle form polyethylene formed in a chromium oxide catalyzed process at a temperature below the solution temperature of the resin;

applying to said particle form polyethylene directly without intermediate chemical treatment a liquid monomer and a polymerization catalyst therefor, the amount of said monomer used being in the range between about 1 and about 100 weight percent based on said polyethylene;

subjecting the resulting monomer wet particle form polyethylene to polymerization conditions for said monomer, in the absence of a diluent without stirring; and recovering said free-flowing composition directly as the product of said method.

4. The method for producing a free-flowing composition which comprises:

preparing a crumb of a polyethylene having a density of 0.94 to 1.00 gm. per cc.;

applying to said polyethylene crumb directly without intermediate chemical treatment, a liquid monomer and a polymerization catalyst therefor, the amount of said monomer used being in the range between about 1 and about 100 weight percent based on said polyethylene;

subjecting the resulting monomer wet polyethylene crumb to polymerization conditions for said monomer, in the absence of a diluent, without stirring; and recovering said free-flowing composition directly as the product of said method.

5. The method for producing a free-flowing composition which comprises:

producing a fine granular solid polymer of a monoolefin;

applying to said granular polymer directly without intermediate chemical treatment, a liquid monomer and a polymerization catalyst therefor, the amount of said monomer being in the range between about 1 and about 100 weight percent based on said polymer;

subjecting the resulting monomer wet high surface area form of polymer to polymerization conditions for said monomer, in the absence of a diluent, without stirring; and recovering said free-flowing composition directly as the result of said method.

6. The method for producing a free-flowing composition which comprises:

producing fluff of a solid polymer of a monoolefin, said fluff being capable of absorbing at least about 50 percent of its own weight of liquid monomer;

applying to said fluff directly without intermediate chemical treatment, a liquid monomer and a polymerization catalyst therefor, the amount of said monomer used being in the range between about 1 and about 100 weight percent based on said polymer;

subjecting the resulting monomer wet polymer fluff to polymerization conditions for said monomer, in the absence of a diluent, without stirring; and recovering said free-flowing composition directly as the product of said method.

7. The method of producing a free-flowing composition which comprises:

recovering solid particle form polymer of a monoolefin formed in a chromium oxide catalyzed process at a temperature below the solution temperature of the polymer;

applying to said particle form polymer directly without intermediate chemical treatment, a liquid monomer and a polymerization catalyst therefor, the amount of said monomer used being in the range between about 1 and about 100 weight percent based on said polymer;

subjecting the resulting monomer wet particle form polymer to polymerization conditions for said monomer, in the absence of a diluent, without stirring; and recovering said free-flowing composition directly as the product of said method.

8. The method for producing a free-flowing composition which comprises:

preparing a crumb of a solid polymer of a monoolefin;

applying to said crumb directly without intermediate chemical treatment, a liquid monomer and a polymerization catalyst therefor, the amount of said monomer used being in the range between about 1 and about 100 weight percent based on said polymer;

subjecting the resulting monomer wet polymer crumb to polymerization conditions for said monomer, in the absence of a diluent, without stirring; and recovering said free-flowing composition directly as the product of said method.

References Cited in the file of this patent

UNITED STATES PATENTS

| | | |
|---|---|---|
| 2,714,076 | Sekel | July 26, 1955 |
| 2,945,828 | Henning | July 19, 1960 |
| 2,987,501 | Rieke et al. | June 6, 1961 |

FOREIGN PATENTS

| | | |
|---|---|---|
| 783,790 | Great Britain | Oct. 2, 1957 |
| 818,412 | Great Britain | Aug. 19, 1959 |